United States Patent [19]
Kim

[11] Patent Number: 5,963,623
[45] Date of Patent: Oct. 5, 1999

[54] METHOD OF STORING TELEPHONE NUMBERS SCANNED FROM FACSIMILE DOCUMENT IN TELEPHONE DIRECTORY OF A FACSIMILE SYSTEM

[75] Inventor: Sung-Hyun Kim, Gumi, Rep. of Korea

[73] Assignee: SamSung Electronics Co., Ltd., Kyungki-do, Rep. of Korea

[21] Appl. No.: 08/901,106

[22] Filed: Jul. 28, 1997

[30] Foreign Application Priority Data

Aug. 1, 1996 [KR] Rep. of Korea ............... 96-32237

[51] Int. Cl.[6] ............................................. H04M 11/00
[52] U.S. Cl. ............... 379/100.01; 358/400; 379/356
[58] Field of Search ................ 379/100.01, 100.02, 379/100.07, 100.14, 356, 440; 358/400, 440; 382/181, 184, 209, 309

[56] References Cited

U.S. PATENT DOCUMENTS

| | | |
|---|---|---|
| 4,086,443 | 4/1978 | Gorham et al. . |
| 4,207,598 | 6/1980 | Reich et al. . |
| 4,249,216 | 2/1981 | Kanda . |
| 4,571,699 | 2/1986 | Herzog et al. . |
| 4,788,709 | 11/1988 | Matsumoto . |
| 4,800,582 | 1/1989 | D'Agosto, III et al. . |
| 4,941,170 | 7/1990 | Herbst . |
| 5,189,527 | 2/1993 | Matsuda et al. ............ 358/400 |
| 5,199,063 | 3/1993 | Erickson et al. ............ 358/400 |
| 5,581,374 | 12/1996 | Shoji ............ 358/440 |
| 5,663,308 | 9/1997 | Park ............ 358/440 |
| 5,798,845 | 8/1998 | Back et al. ............ 379/356 |

FOREIGN PATENT DOCUMENTS

| | | |
|---|---|---|
| 0354703 A2 | 7/1989 | European Pat. Off. . |
| 2301470 | 12/1996 | United Kingdom . |

*Primary Examiner*—Curtis A. Kuntz
*Assistant Examiner*—Melur Ramakrishnaiah
*Attorney, Agent, or Firm*—Robert E. Bushnell, Esq.

[57] ABSTRACT

A method of storing telephone number information written on a document in a memory of a facsimile system which determines whether an input key from a keypad corresponds to a key requesting storage of telephone number information in the memory; determines whether a document is loaded in a document feeder of the facsimile system, when the input key from the keypad corresponds to the key requesting storage of the telephone number information in the memory; and scans the document to detect whether a pattern of characters from scanned document contains any telephone number information, and stores the telephone number information from scanned document in the memory, when the document is loaded in the document feeder of the facsimile system.

11 Claims, 5 Drawing Sheets

| | |
|---|---|
| ONE_TEL_LIST 1 | 20 BYTE |
| 2 | 20 BYTE |
| 3 | 20 BYTE |
| 4 | 20 BYTE |
| 5 | 20 BYTE |
| SPD_TEL_LIST 01 | 20 BYTE |
| 02 | 20 BYTE |
| 03 | 20 BYTE |
| ⋮ | ⋮ |
| 20 | 20 BYTE |

*FIG. 3*

| | | |
|---|---|---|
| 1 | 4602854 | SAMSUNG FAX |
| 2 | 4602861 | FLOWER SHOP |
| 0 | 4633245 | BARBER SHOP |
| | | |
| 03 | 4635432 | MAMY |
| 07 | 4562345 | HARDWARE STORE |
| 00 | 4352354 | CITY HALL |

*FIG. 4*

TELEPHONE NUMBER LIST

ONE-TOUCH

| NO | NUMBER | NAME |
|----|--------|------|
| 1 | 4602854 | SAMSUNG FAX |
| 2 | 4602861 | FLOWER SHOP |
| 0 | 4633245 | BARBER SHOP |

SPEED-DIAL

| NO | NUMBER | NAME |
|----|--------|------|
| 03 | 4635432 | MAMY |
| 07 | 4562345 | HARDWARE STORE |
| 00 | 4352354 | CITY HALL |

*FIG. 5*

METHOD OF STORING TELEPHONE NUMBERS SCANNED FROM FACSIMILE DOCUMENT IN TELEPHONE DIRECTORY OF A FACSIMILE SYSTEM

CLAIM FOR PRIORITY

This application makes reference to, incorporates the same herein, and claims all benefits accruing under 35 U.S.C. §119 from an application for TELEPHONE NUMBER STORING FACSIMILE MACHINE AND METHOD OF STORING TELEPHONE NUMBERS IN FACSIMILE MACHINE earlier filed in the Korean Industrial Property Office on the 1st of Aug. 1996, and there duly assigned Serial No. 32237/1996, a copy of which application is annexed hereto.

BACKGROUND OF THE INVENTION

1. Technical Field

The present invention generally relates to a facsimile system and process of storing telephone numbers, and more particularly, relates to a facsimile system capable of scanning a document, recognize characters and telephone numbers written on the document and store recognized characters and telephone numbers automatically in a memory which serves as a telephone directory for subsequent use.

2. Related Art

Conventional facsimile systems available in the market today contain a long list of sophisticated options for the convenience of users. For facsimile systems used primarily in an office environment, one of those convenient service features is to create and maintain a list of telephone numbers and related information of predetermined facsimile transmission sources in a telephone directory for a variety of reasons. One reason is to facilitate automatic dialing of a selected facsimile transmission source based on the telephone numbers contained in the telephone directory. Another reason is to accept an incoming facsimile document only from a particular facsimile transmission source while restricting facsimile communication with other facsimile transmission sources for the purpose of securing its confidential information and avoiding unwanted facsimile transmission, such as disclosed, for example, in U.S. Pat. No. 5,274,467 for Facsimile Apparatus Capable of Desired Processing Dependent On Terminal Number Of Calling Party issued to Takehiro et al., U.S. Pat. No. 5,293,253 for Facsimile Apparatus For Receiving Facsimile Transmission Selectively issued to Kida et al., U.S. Pat. No. 5,349,447 for Facsimile Machine issued to Kuwahara et al., and U.S. Pat. No. 5,379,124 for Facsimile System issued to Ikegaya et al.

The telephone directory includes not only telephone numbers of remote communication systems but also their corresponding names and related information which may be available for a visual display for dialing selection and visual confirmation when a selected telephone number is dialed. Generally, in order to store a telephone number in traditional facsimile system, the user must follow the operation manual to manually input a prescribed key combination representing the input telephone number for storage in internal memory. Another technique such as disclosed in U.S. Pat. No. 4,249,216 for Facsimile Transceiver Apparatus issued to Kanda, seeks to automatically store a telephone number and related information in internal memory as the number is being dialed by the user. Other technique as disclosed, for example, in U.S. Pat. No. 4,800,582 for Method And Apparatus For Creating And Storing Telephone Directory Listings issued to D'Agosto, III et al., further allows rapid downloading of previously recorded directory listings of telephone number information from a magnetic recording medium to an internal memory for subsequent use. While contemporary techniques for creating a telephone directory in facsimile systems are noteworthy, it is my observation that a different, yet simpler technique can still be contemplated.

SUMMARY OF THE INVENTION

Accordingly, it is therefore an object of the present invention to provide an improved facsimile system and process.

It is also an object to provide a facsimile system and process of creating a telephone number list for subsequent speed dial services.

It is another object to provide an improved facsimile system and process of scanning a document containing telephone numbers written thereon, and automatically storing the telephone numbers from scanned document in a telephone number list included in memory.

These and other objects of the present invention can be achieved by a method of storing telephone number information written on a document in a memory of a facsimile system, which comprises determining whether an input key from a keypad corresponds to a key requesting storage of telephone number information in the memory; when the input key from the keypad corresponds to the key requesting storage of the telephone number information in the memory, determining whether a document is loaded in a document feeder of the facsimile system; and when the document is loaded in the document feeder of the facsimile system, scanning the document, determining whether a character pattern of characters from scanned document contains any telephone number information, and storing the telephone number information from scanned document in the memory.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 3 illustrates a memory map for storing telephone numbers in accordance with the present invention;

FIG. 4 illustrates a document in which telephone numbers are written; and

FIG. 5 illustrates a printed form of a telephone number list in accordance with the present invention.

DETAILED DESCRIPTION OF THE PREFERRED EMBODIMENT

Figure 1:
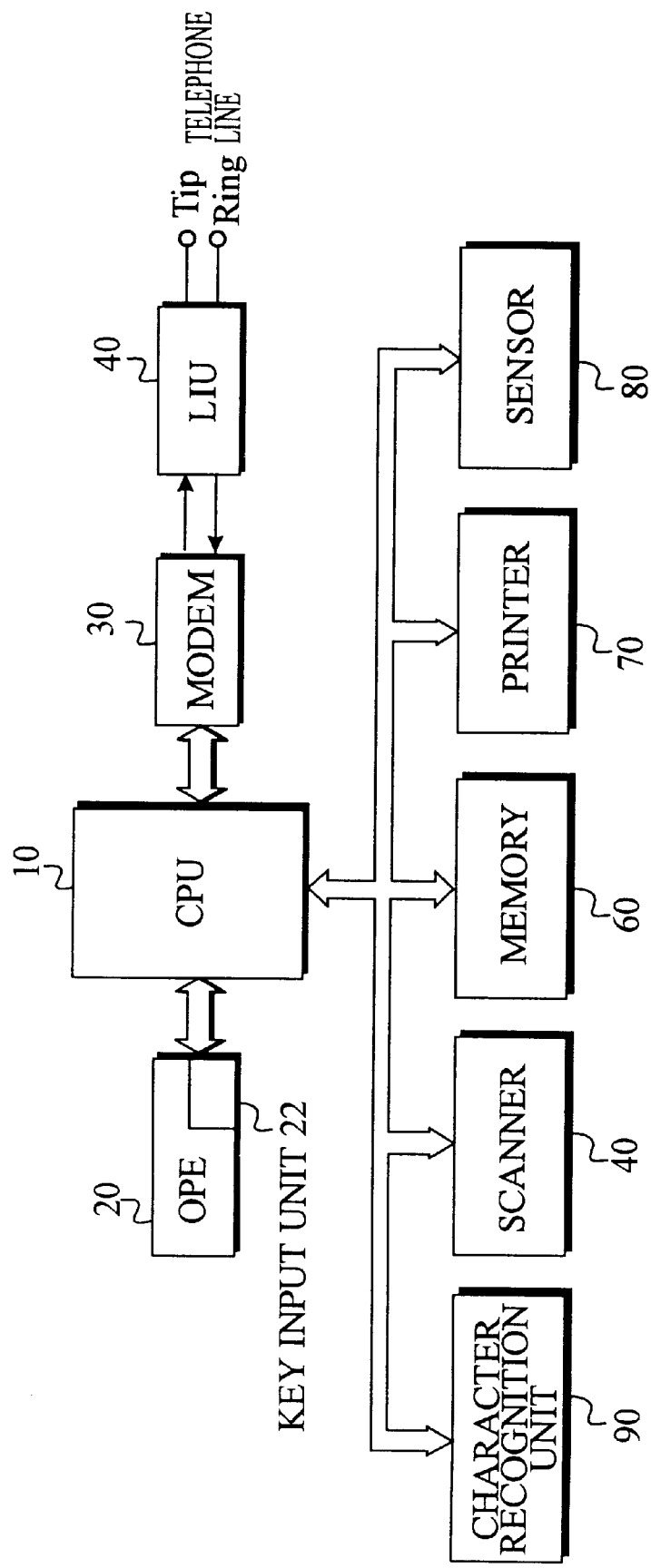
FIG. 1 illustrates a facsimile system constructed according to the principles of the present invention.

Referring now to the drawings and particularly to FIG. 1, which illustrates a facsimile system constructed according to the principles of the present invention. The facsimile system includes a central processing unit (CPU) 10 for controlling operations of the facsimile system, an operational panel OPE 20 including a key input unit 22, a line interface unit LIU 40 connected to a tip and ring terminal of a telephone line, a modem 30, a scanner 50, a memory 60, a printer 70, a sensor 80, a character recognition unit 90, and a telephone (not shown).

Memory 60 includes a program read-only-memory (ROM) and a data random-access-memory (RAM). The ROM stores a program for the CPU 10 to control the general operation of the facsimile system for transmission or reception of image data from another facsimile system, and a program for scanning a document, recognizing characters and telephone numbers of a document and storing recognized characters and telephone numbers in a telephone directory stored in RAM for subsequent use according to the principles of the present invention. The data RAM also temporarily stores a variety of items of data information relating to the operation of the facsimile system.

The OPE 20 includes a key input unit 22 and a display unit. The key input unit 22 of the OPE 20 comprises a plurality of discrete keys including a telephone number storing key for generating key data to the CPU 10 to control the scanning of a document for telephone numbers and storing telephone numbers written on the document in a telephone number list (telephone directory) contained in memory 60, and a plurality of function keys for allowing the user to register a single or a plurality of telephone numbers of a predetermined group of facsimile transmission sources in the memory 60. The display unit of the OPE 20 displays data indicating various modes of operations of the facsimile system, including a visual display of a telephone number list contained in memory 60 for visual confirmation and user selection of a telephone number for dialing service. The sensor 80 senses whether a document is input into the facsimile system, or whether copy paper is stored and available for use, and generates an indicative signal to the CPU 10. The scanner 50 transports and scans an image of the input document and then generates image data corresponding to the scanned image. The image data output from the scanner 50 is then processed for either transmission via a telephone line or copy during the copy mode under control of the controller 10. The printer 70 prints the processed image data received from the LIU 40 on a printable medium such as individual cut sheets of papers during the reception mode and the copy mode under the control of the CPU 10. The character recognition unit 90 deciphers the characters forming telephone numbers and their corresponding names written on the scanned document, and sends the same to the CPU 10 for storage in the memory 60.

The modem 30 modulates the processed image data output from the CPU 10 into a modulated image signal for transmission, and duplicates the image signal input to the CPU 10 during the reception mode under the control of the CPU 10. The LIU 40 is connected with a tip and ring terminals of a telephone line to form transmission and reception paths for the modem 30 under the control of the CPU 10.

Figure 2:
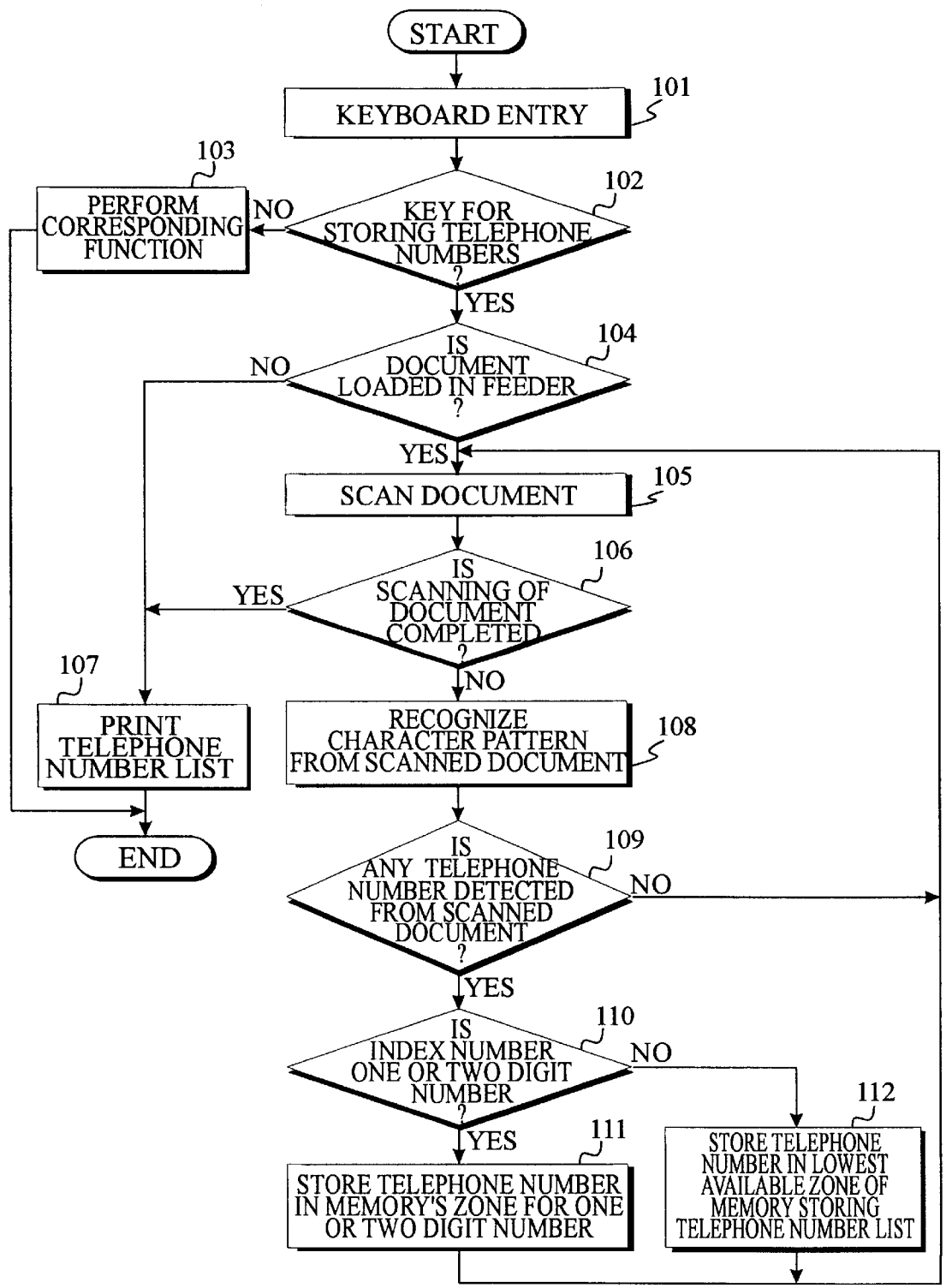
FIG. 2 illustrates a flow chart of a control sequence for scanning and storing telephone numbers in a facsimile system according to the principles of the present invention.

Turning now to FIG. 2 which illustrates a flow chart of a control sequence for scanning and storing telephone numbers in memory 20 according to the principles of the present invention. FIG. 3 depicts a memory map contained in memory 60 for storing telephone numbers according to the principles of the present invention. FIG. 4 depicts a document on which telephone numbers are written. FIG. 5 is a print form of a telephone number list compiled in memory 60 in accordance with the present invention. The telephone number list (i.e., telephone directory) contains information relating to telephone numbers and their corresponding names as well as dialing services such as a one-touch service and a speed-dial service available for speed dialing a selected number contained in the telephone number list.

Referring to FIGS. 1 to 5, a preferred embodiment of the present invention will now be described hereinbelow.

When a key instruction is input through OPE 30 at step 101, CPU 10 proceeds to step 102 and determines if the input key is the telephone number storing key. If the input key is not the telephone number storing key at step 102, CPU proceeds to step 103 to perform a corresponding function. If the input key is the telephone number storing key, however, CPU 10 checks if a document is loaded in a document feeder at step 104. Where there is no document in the document feeder, CPU 10 controls printer 70 to print a telephone number list containing all telephone numbers currently stored therein as shown in FIG. 5. If the document is loaded in the document feeder, however, CPU 10 scans the document and stores digital data corresponding to the image on the document at step 105. CPU 10 then checks if the scanning of the document is completed at step 106. If the scanning of the document is completed, CPU 10 controls printer 70 to print out a telephone number list including all telephone numbers currently stored therein at step 107.

If the scanning of the document is not completed, however, CPU 10 controls character recognition unit 80 to recognize and analyze the character pattern contained in the scanned document at step 108. After analyzing the character pattern, CPU 10 checks if any telephone number contained on the document is detected at step 109. If no telephone number is detected, CPU 10 returns to step 105 and continues scanning the document. However, if telephone number is detected at step 109, CPU checks if an index number detected by character recognition unit 80 is a one-digit number or a two-digit number at step 110. If the recognized index number is not a one-digit number or a two-digit number, CPU 10 stores a telephone number for the recognized index number in a lowest available zone of memory 60 storing telephone numbers at step 112. If the recognized index number is a one-digit number or a two-digit number, CPU 10 detects a corresponding index number and stores its telephone number in a zone of memory 60 corresponding to the index number at step 111.

When the very first scanned index number is a one-digit number, the index number corresponds to the zone for one-touch dial number included in memory 60. Similarly, when the scanned index number is a two-digit number, the index number corresponds to the zone for speed dial number included in memory 60. Accordingly, when the very first scanned index number is one-digit or two-digit one, it is stored in memory 20's zone for one-touch dial number or a zone for speed dial number. For example, if the document contains telephone numbers as shown in FIG. 4, and the very first scanned index number is 1, 460-2854 is stored in memory 20's 1st zone for one-touch dial number. If the scanned index number is 2, 460-2861 is stored in memory's 2nd zone for one-touch dial number. If the scanned index number is 0, 460-3245 is stored in a zone of memory 20 next to the zone storing the last one-touch dial number. The step of storing telephone numbers in memory's zone for speed dial number is the same as that of one-touch dial number. In order to store telephone numbers written on a document, the user inputs index numbers to each zone of the memory storing telephone numbers, as shown in FIG. 3, and assigns the index numbers to telephone numbers so that the facsimile system may recognize characters of the index numbers and their corresponding telephone numbers.

As described above, the present invention advantageously provides a technique of scanning a document in which telephone numbers which are written, using a character recognition unit to decipher the characters, and automatically storing those telephone numbers in a memory in order to allow the user a quick and convenient way of dialing without troublesome keyboard input.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of storing telephone number information written on a document in a memory of a facsimile system, comprising:

determining whether an input key from a keypad corresponds to a key requesting storage of telephone number information in the memory;

when the input key from the keypad corresponds to the key requesting storage of the telephone number information in the memory, determining whether a document is loaded in a document feeder of the facsimile system; and when the document is loaded in the document feeder of the facsimile system, scanning the document, determining whether a pattern of characters from the scanned document contains any telephone number information, and storing the telephone number information from scanned document in the memory.

2. The method of claim 1, further comprised of performing a corresponding function requested from the input key, when the input key from the keypad does not correspond to the key requesting storage of telephone number information in the memory.

3. The method of claim 2, further comprised of printing out the existing telephone directory, when the document is not loaded in the document feeder of the facsimile system.

4. The method of claim 3, further comprised of said telephone number information written on the document including a listing of telephone numbers and corresponding names in different lines of the document furnished with index numbers for serving as either a one-touch dialing service or a speed-dialing service.

5. The method of claim 4, further determining whether the index number identified from the scanned document is a one-digit number, and storing a corresponding telephone number and name in a first zone of said memory classified for a one-touch dialing service, when the index number identified from the scanned document is said one-digit number.

6. The method of claim 5, further determining whether the index number identified from the scanned document is a two-digit number, and storing a corresponding telephone number and name in a second zone of said memory classified for a speed-dialing service, when the index number identified from the scanned document is said two-digit number.

7. The method of claim 1, further comprised of said telephone number information written on the document including a listing of telephone numbers and corresponding names in different lines of the document furnished with index numbers for serving as either a one-touch dialing service or a speed-dialing service.

8. The method of claim 7, further determining whether the index number identified from the scanned document is a one-digit number, and storing a corresponding telephone number and name in a first zone of said memory classified for a one-touch dialing service, when the index number identified from the scanned document is said one-digit number.

9. The method of claim 8, further determining whether the index number identified from the scanned document is a two-digit number, and storing a corresponding telephone number and name in a second zone of said memory classified for a speed-dialing service, when the index number identified from the scanned document is said two-digit number.

10. A facsimile system, comprising:

a key input unit having at least a telephone number storage key for permitting an operator to store a telephone directory;

a scanning unit, in response to input of the telephone number storage key, for scanning a document containing thereon a telephone directory of telephone numbers and corresponding names in different lines of the document furnished with index numbers for indexing the telephone numbers as one of a one-touch dialing service and a speed-dialing service;

a character recognition unit for recognizing a character pattern indicative of the telephone directory from the scanned document;

a memory for storing the telephone directory including the scanned index numbers and corresponding telephone numbers;

a printing unit for printing the telephone directory of telephone numbers currently stored in the memory; and a control unit for controlling the scanning of the document loaded in the document feeder on receipt of the telephone number storage key, the recognition of the character pattern from the scanned document, and the storing of telephone directory in the memory.

11. The facsimile system of claim 10, further comprising a display unit for providing a visual display of the telephone directory for user selection of telephone number for one of said one-touch dialing service or said speed dialing service.

* * * * *